(No Model.)
S. TRETHEWEY.
CLUTCH.
No. 495,686. Patented Apr. 18, 1893.
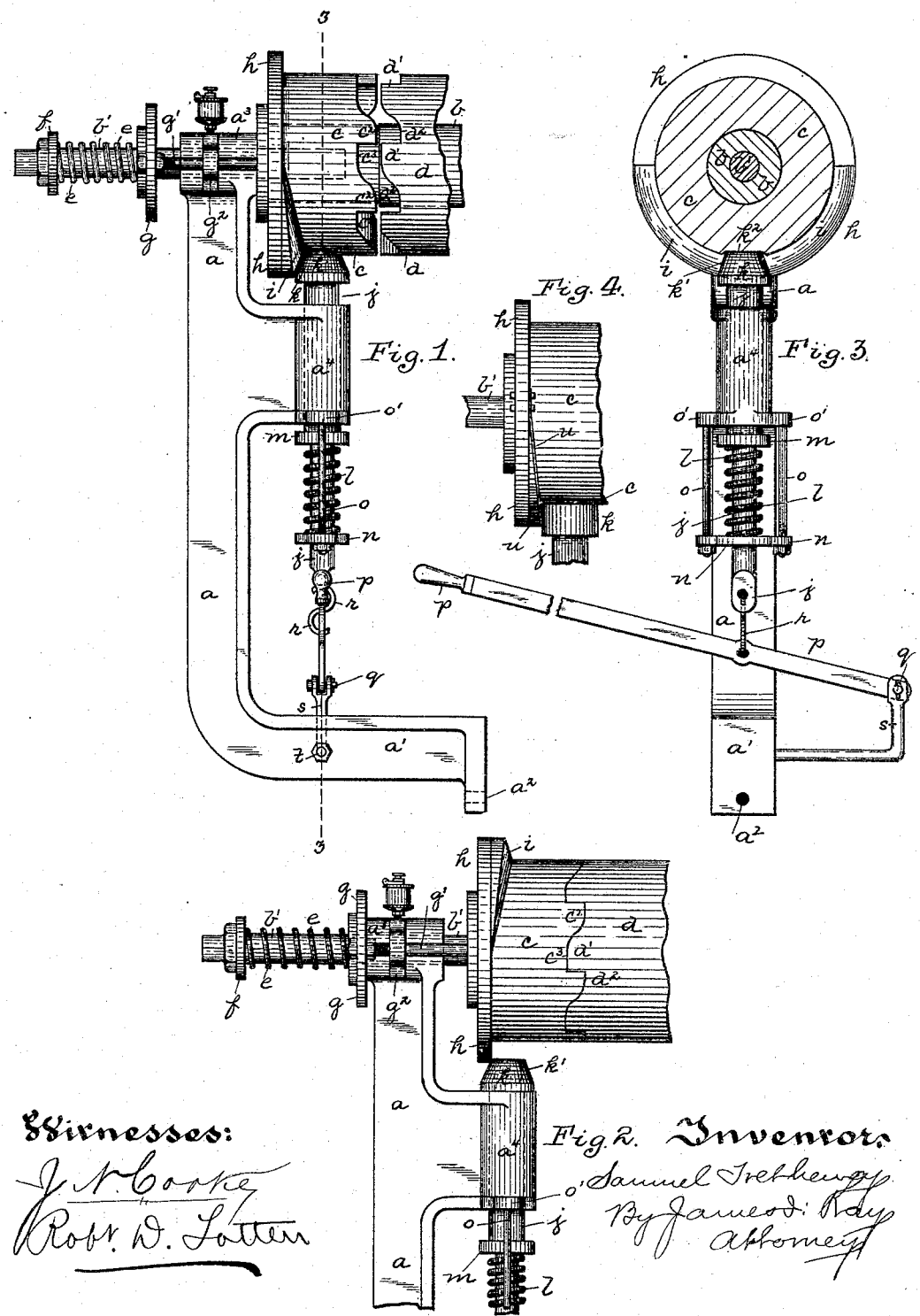
Witnesses:
J. N. Cooke
Robt. D. Totten
Inventor:
Samuel Trethewey
By James D. Ray
Attorney

UNITED STATES PATENT OFFICE.

SAMUEL TRETHEWEY, OF PITTSBURG, PENNSYLVANIA, ASSIGNOR TO THE TRETHEWEY MANUFACTURING COMPANY, OF SAME PLACE.

CLUTCH.

SPECIFICATION forming part of Letters Patent No. 495,686, dated April 18, 1893.

Application filed December 7, 1891. Serial No. 414,232. (No model.)

*To all whom it may concern:*

Be it known that I, SAMUEL TRETHEWEY, a resident of Pittsburg, in the county of Allegheny and State of Pennsylvania, have invented a new and useful Improvement in Clutches; and I do hereby declare the following to be a full, clear, and exact description thereof.

My invention relates to clutches, and has special reference to what are known as interlocking clutches, that is, ones in which the clutch box has formed on its coacting faces a series of alternate projections and recesses which when in engagement will fit into each other and so act to revolve the shaft on which it is mounted and so operate the machinery to which it is attached.

One of the objects of my invention is to provide a clutch which will operate in connection with a certain class of machinery known as shears or shearing machines, such as for cutting sheets, plates, bars, &c., or other machinery in which it may be desired to get only one stroke of the shearing knife or reciprocating part of the machine for certain purposes, as where a number of sheets, plates, bars, &c., are to be sheared or cut at one time.

To these ends my invention consists, generally stated, in combining with the shaft to be driven a rotating clutch member mounted thereon, a spring operated clutch member having a sliding connection with the shaft, and provided with a flange having an inclined face thereon on which travels a plunger mounted at an angle to the clutch, said plunger traveling on the inclined face and withdrawing the sliding clutch member from engagement with the other clutch member, but when itself withdrawn permitting the clutches to engage and rotate the shaft, and when released said plunger again traveling up the inclined face and withdrawing the sliding clutch member, so that the shaft may be rotated for a single turn by the withdrawal and release of the plunger; such mechanism being thus adapted to impart a single stroke to the shear or other reciprocating mechanism in order to shear or cut the sheets, plates or bars placed thereon.

It also consists in operating the plunger by spring power of greater strength than the spring operating the sliding clutch member, and forming the head of the plunger wedge-shaped so that after withdrawing the sliding clutch member it may press it back by means of its wedge-shaped head and carry it free from the other clutch member.

It also consists in certain other details of construction which will be hereinafter more fully set forth and claimed.

To enable other skilled in the art to make and use my invention, I will describe the same more fully, referring to the accompanying drawings, in which—

Figure 1 is a side view of my improved clutch showing it out of engagement. Fig. 2 is another side view showing it in engagement. Fig. 3 is a vertical section on the line 3—3, Fig. 1, showing some of the parts in full lines, and Fig. 4 is a view of another form of my invention.

Like letters of reference indicate like parts in each of the figures of the drawings.

In said drawings I have illustrated at $a$ the support or hanger for carrying my improved clutch, which has the projection $a'$ so that it can be bolted at $a^2$ to the machine to be operated. At the upper end of said support or hanger $a$ is the bearing $a^3$, in which is mounted the auxiliary shaft $b'$, which fits within the main driving shaft $b$ of the machine, said driving shaft $b$ carrying the sliding clutch member $c$, which slides thereon by a feather and groove or other suitable sliding connection, the said sliding clutch member $c$ having on its engaging face the projections $c^2$ and recesses $c^3$ which engage with like projections $d'$ and recesses $d^2$ on the engaging face of the rotating clutch member $d$ which is also mounted on the said main driving shaft $b$, and the said rotating clutch member $d$ being part of the machine, generally the bearing of the large gear wheel which drives the class of machines which I have described. The said projections $c^2$ on the sliding clutch member $c$ fit into the recesses $d^2$ on the rotating clutch member $d$ and the projections $d'$ on the rotating clutch member $d$ fit into the recesses $c^3$ on the sliding clutch member $c$, and so acting to turn and operate the clutch when in engagement.

Around the auxiliary shaft $b'$ is placed the spiral spring $e$, which is interposed between a rigid collar $f$ and a movable collar $g$, said movable collar $g$ being connected to the sliding clutch member $c$ by bolts $g'$ passing through lugs $g^2$ on each side of the bearing $a^3$ of the support or hanger $a$.

On the sliding clutch member $c$ is the flange $h$ having on its side the inclined face $i$ on which travels the spring operated plunger $j$, which is mounted in the bearing $a^4$ of the support or hanger $a$, at an angle to the said inclined face $i$, the said plunger $j$ having the wedge-shaped head $k$ thereon which engages with the inclined face $i$, and said wedge-shaped head $k$ being inclined at $k'$ so as to overcome friction when traveling thereon, and also to enable it to fit more closely within the seat $k^2$ in the sliding clutch member $c$ so as to withdraw it from engagement with the rotating clutch member $d$, as hereinafter described.

Mounted on the spring operated plunger $j$ is the heavy spiral spring $l$ being interposed between the flange $m$ on the plunger $j$ and the plate $n$ passing around the plunger $j$, and being held in place by bolts $o$ passing through the plate $n$ and connecting with lugs $o'$ on the bearing $a^4$. The lower end of the plunger $j$ is connected to the hand lever $p$ by the link $r$, the said hand lever $p$ being fulcrumed at $q$ to a post $s$, which is bolted to the support or hanger $a$ at $t$, and in case it is desired to operate the plunger by either hand or foot power, the hand lever $p$ can be attached at $q$ directly to the plunger $j$ and a rod run down therefrom and connected to a foot lever which is fulcrumed to the floor, so that it can be operated either way.

In Fig. 4 I have shown another form of my invention for preventing the coacting faces from striking against each other either from wear or other causes, by placing a spring $u$ on said inclined face $i$, so that when the head $k$ is in contact therewith the spring $u$ will also act to force or keep back the sliding clutch member $c$ from contact or interference with the rotary clutch member $d$.

The operation of my improved clutch is as follows:—As is shown in Fig. 1, the normal position of the sliding clutch member $c$ is shown as withdrawn from engagement with the rotating clutch member $d$ which is revolving continuously on the main driving shaft $b$, the sliding clutch member $c$ being held back in tension on account of the spring $e$ being contracted by the wedge-shaped head $k$, and the spring operated plunger $j$ being at its highest point on the inclined face $i$, so pressing back the sliding clutch member $c$ through the bolts $g'$, spring $e$ and movable collar $g$, sliding on the auxiliary shaft $b'$. In case the engaging face of the sliding clutch member $c$ does not clear the engaging face of the rotating clutch member $d$ either from the wearing on the parts composing the clutch or from other means, the seat $k^2$ in the sliding clutch member $c$ allows the wedge-shaped head $k$ of the plunger $j$ to fit closely therein and so act to press back the sliding clutch member $c$ out of engagement on account of the spiral spring $l$ on the plunger $j$ being of greater strength than the spiral spring $e$ on the auxiliary shaft $b'$, so overcoming the resistance of the spring $e$ and enabling the sliding clutch member $c$ to be pressed back far enough to clear the engaging face of the rotating clutch member $d$.

When it is desired to operate the machine through the medium of my improved clutch, all that is necessary for the operator to do is to grasp the hand lever $p$ and pull it down, so contracting the spring $l$ and causing the wedge-shaped head $k$ of the plunger $j$ to be released from the inclined face $i$ and the flange $h$, when the sliding clutch member $c$, being held in tension by the contraction of the spring $e$, will be rapidly thrown into engagement with the rotating clutch member $d$ through the projections $c^2$, $d'$ and the recesses $c^3$, $d^2$, and so operate to give the machine a single stroke or turn. Immediately upon the wedge-shaped head $k$ being released from the inclined face $i$ and the flange $h$, and the pressure also released from the hand lever $p$, the clutch operates to make the one revolution or turn of the machine, and the wedge-shaped head $k$ travels around the sliding clutch member $c$; when it reached the inclined face $i$, traveling up the same until it reaches its highest point and enters the seat $k^2$ so withdrawing the sliding clutch member $c$ to its normal position, when it is again ready for another operation. In case it is desired to give the clutch a number of revolutions, all that is necessary is to hold the hand lever $p$ down by the pressure until the required amount or number of strokes or revolutions of the machine are given, when the hand lever $p$ can be released and the clutch will return to its normal position. It will thus be seen that the operation of my improved clutch is simple and positive and can be readily applied to the machine to be operated, being cheap in its construction and strong in its parts, and not liable to get out of order, and when any of its parts are broken, they can easily be replaced in the least possible time.

What I claim as my invention, and desire to secure by Letters Patent, is—

1. In a clutch, the combination with a shaft, of a rotary clutch member mounted thereon, a spring actuated sliding clutch member adapted when released to engage therewith, and having an inclined face, and a spring actuated plunger mounted at an angle to the sliding clutch member and having a wedge-shaped head engaging with the inclined face on the sliding clutch member to withdraw it, the spring operating the plunger being of greater strength than the spring operating the sliding clutch member, substantially as and for the purposes set forth.

2. In a clutch, the combination with a shaft, of a rotary clutch member mounted thereon, and a spring actuated sliding clutch member adapted when released to engage therewith and having an inclined face, and a seat in the body portion thereof, and a spring actuated plunger mounted at an angle to the sliding clutch member and having a wedge-shaped head engaging with the inclined face on the sliding clutch member to withdraw it and adapted to enter the seat in the sliding clutch member, substantially as and for the purposes set forth.

3. In a clutch, the combination with a shaft, of a rotary clutch member mounted thereon, a spring actuated sliding clutch member adapted, when released, to engage therewith, and a plunger mounted at an angle to the same and having a head thereon engaging with an inclined face, said inclined face having a spring thereon to engage with said head, substantially as and for the purposes set forth.

In testimony whereof I, the said SAMUEL TRETHEWEY, have hereunto set my hand.

SAMUEL TRETHEWEY.

Witnesses:
ROBT. D. TOTTEN,
J. N. COOKE.